United States Patent
Lee et al.

(10) Patent No.: US 7,203,360 B2
(45) Date of Patent: Apr. 10, 2007

(54) LEARNABLE OBJECT SEGMENTATION

(76) Inventors: Shih-Jong J. Lee, 15418 SE. 53rd Pl., Bellevue, WA (US) 98006; Seho Oh, 5025 145th Pl. SE., Bellevue, WA (US) 98006

( * ) Notice: Subject to any disclaimer, the term of this patent is extended or adjusted under 35 U.S.C. 154(b) by 847 days.

(21) Appl. No.: 10/410,063

(22) Filed: Apr. 9, 2003

(65) Prior Publication Data

US 2004/0202368 A1 Oct. 14, 2004

(51) Int. Cl.
*G06K 9/34* (2006.01)
(52) U.S. Cl. ............... 382/173; 382/171; 382/155; 382/175
(58) Field of Classification Search ........... 382/103, 382/173, 171, 175, 180, 155, 128, 169, 181, 382/133, 224, 226, 240, 274; 348/150, 155, 348/144, 149, 159, 218.1, 169; 706/13, 10, 706/902; 345/629, 582, 583, 600, 605
See application file for complete search history.

(56) References Cited

U.S. PATENT DOCUMENTS

| | | | | |
|---|---|---|---|---|
| 5,048,095 | A * | 9/1991 | Bhanu et al. | 382/173 |
| 5,953,055 | A * | 9/1999 | Huang et al. | 348/155 |
| 6,195,121 | B1 * | 2/2001 | Huang et al. | 348/150 |
| 6,396,939 | B1 * | 5/2002 | Hu et al. | 382/128 |
| 6,904,159 | B2 * | 6/2005 | Porikli | 382/103 |
| 6,985,612 | B2 * | 1/2006 | Hahn | 382/128 |
| 7,092,548 | B2 * | 8/2006 | Laumeyer et al. | 382/104 |

OTHER PUBLICATIONS

Lee, JSJ, Haralick, RM and Shapiro, LG, "Morphologic Edge Detection," IEEE Trans. Robotics and Automation RA3(2):142-56, 1987.
Haralick RM and Shapiro, LG, "Survey Image Segmentation Techniques," Comput. Vision, Graphics Image Processing, vol. 29: 100-132, 1985.
Haralick, RM, Shapiro, RG, "Computer and Robot Vision", vol. I, pp. 511-535, Addison Wesley, 1992.
Otsu N, "A Threshold Selection Method for Gray-level Histograms," IEEE Trans. System Man and Cybernetics, vol. SMC-9, No. 1, Jan. 1979, pp. 62-66.

(Continued)

*Primary Examiner*—Anh Hong Do

(57) ABSTRACT

A segmentation method receives a learning image and an objects of interest specification. A segmentation learning method creates a segmentation recipe output. It performs a segmentation application using the second image and the segmentation recipe to create a segmentation result output. The segmentation learning method includes an object region of interest segmentation learning step and an object type specific segmentation learning step. The segmentation application method includes an object region of interest segmentation step and an object type specific segmentation step. The learnable object segmentation method further comprises an online learning and a feedback learning step that allows the update of the segmentation recipe automatically or under user direction.

12 Claims, 5 Drawing Sheets

OTHER PUBLICATIONS

Hall, M. A. Correlation-based feature selection for discrete and numeric class machine learning. Proceedings of the Seventeenth International Conference on Machine Learning, Stanford University, CA. Morgan Kaufman Publishers, 2000.

Devijver and Kittler, Pattern Recognition: A Statistical Approach, PHI, NJ, 1982 pp. 212-219.

Breiman L., Friedman J. H., Olshen R. A. and Stone C. J., "Classification And Regression Trees", Chapman &Hall/CRC, 1984, pp. 18-58.

Quinlan J. R., "C4.5 Programs For Machine Learning", Morgan Kaufmann, 1993, pp. 17-26.

Robert E. Schapire, "The boosting approach to machine learning: An overview." In MSRI Workshop on Nonlinear Estimation and Classification, 2001.

Dietterich, T. G. Ensemble Methods in Machine Learning. In J. Kittler and F. Roli (Ed.) First International Workshop on Multiple Classifier Systems, Lecture Notes in Computer Science (pp. 1-15). New York: Springer Verlag, 2000.

Hu, MK, "Visual Pattern Recognition by Moment Invariants", IRE Transactions on Information Theory, pp. 179-187. Feb. 1962.

Haralick, RM, Shapiro, RG, "Computer and Robot Vision", vol. I, pp. 28-48, Addison Wesley, 1992.

Serra, J, "Image analysis and mathematical morphology," London: Academic, 1982, p. 395, pp. 385-387.

* cited by examiner

LEARNABLE OBJECT SEGMENTATION

TECHNICAL FIELD

This invention relates to a method for learnable object segmentation for an image.

BACKGROUND OF THE INVENTION

Object segmentation processes images containing objects of interest and determines the regions in the images corresponding to those objects of interest. Object segmentation is the key to follow on processing in any imaging applications. If segmented object regions are incorrect. The measurements performed on the segmented objects will certainly be incorrect and therefore any analysis and conclusion drawn based on the incorrect measurements will be erroneous and compromised.

It is difficult to specify what constitutes an object of interest and define the specific segmentation procedures. General segmentation procedures tend to obey the following rules:

Regions of object segmentation should be uniform and homogeneous with respect to some characteristic, such as gray level or texture.

Region interiors should be simple and without many small holes.

Adjacent regions of different objects should have significantly different values with respect to the characteristic on which they are uniform.

Boundaries of each segment should be simple, not ragged, and must be spatially accurate.

Enforcing the above rules is difficult because strictly uniform and homogeneous regions are typically full of small holes and have ragged boundaries. Insisting that adjacent regions have large differences in values could cause regions to merge and boundaries to be lost. Therefore, it is very difficult to create a universal object segmentation method that will work on all types of objects.

It is highly desirable to create a general-purpose object segmentation method that can be trained to automatically differentiate different types of objects of interest. The differentiated objects may not have clear intensity differences or high edge contrast in the particular image analysis application.

OBJECTS AND ADVANTAGES

It is an object of the invention to provide a versatile object segmentation method that can be trained to automatically perform object segmentation for almost all image processing applications. The other objective of the invention is to provide an accurate and robust method for object segmentation on complicated object types. Another objective of the invention is to provide a semi-automatic method for user to train the segmentation recipe. A fourth objective of the invention is to provide a method to automatically update the segmentation recipe. The learnable object segmentation method of this invention is general purpose. It makes complex associations of image pixels to objects. It performs unique intelligent pixel classification and context dependent region merging and refinement. To optimize the segmentation recipe for a given purpose, a purpose directed learning tool allows the users teach the object segmentation method by example. This not only improves the object segmentation result, it improves the human interaction efficiency.

SUMMARY OF THE INVENTION

A learnable object segmentation method receives a learning image and objects of interest specification. A segmentation learning method uses the input image and the objects of interest specification to create a segmentation recipe output. It receives a second image and performs the segmentation application using the second image and the segmentation recipe to create a second image segmentation result output. The segmentation learning method includes an object region of interest segmentation learning step, and an object type specific segmentation learning step. The segmentation application method includes an object region of interest segmentation step, and an object type specific segmentation step.

The learnable object segmentation method further comprises an online learning and a feedback learning step that allows updating of the segmentation recipe automatically or under user direction.

BRIEF DESCRIPTION OF THE DRAWINGS

The preferred embodiment and other aspects of the invention will become apparent from the following detailed description of the invention when read in conjunction with the accompanying drawings which are provided for the purpose of describing embodiments of the invention and not for limiting same, in which.

DETAILED DESCRIPTION OF THE INVENTION

The object segmentation method of this invention includes two steps. The first step, object region of interest segmentation, detects the global object region of interest for each object type. The second step, object type segmentation, performs focused object of interest segmentation for each type within its object region of interest. Therefore, specific objects of interest segmentation methods could be applied to a specific object type to optimize the object segmentation within its object region of interest. The processing flow for the segmentation approach of this invention is shown in FIG. 1.

Figure 1:
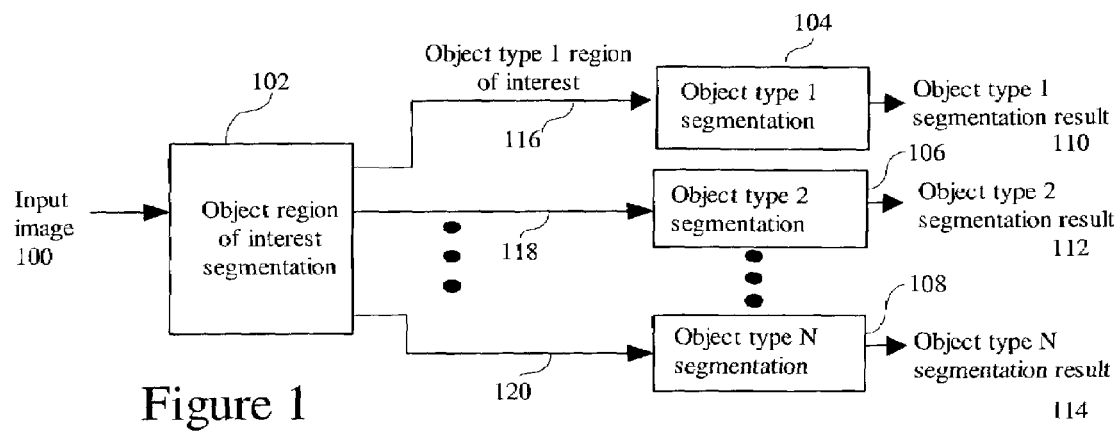
FIG. 1 shows the processing flow for the object segmentation method.

As shown in FIG. 1, the input image 100 is processed by an object region of interest segmentation method of this invention 102. The segmented object type region of interest 116, 118, 120 for different object types are used by the object type specific segmentation modules 104, 106, 108 to produce object type specific segmentation results 110, 112, 114.

Figure 2:
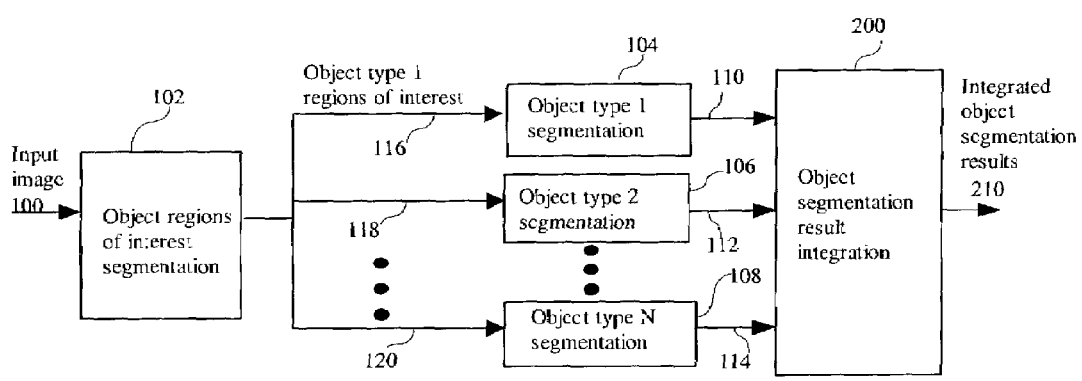
FIG. 2 shows an alternative processing flow for the object segmentation method.

Note that the object region of interest for different object types do not have to be mutually exclusive. Therefore, one image location could be processed by multiple object type specific segmentation modules and could have multiple types of object segmentation result. In this case an object segmentation result integration module 200 as shown in FIG. 2 is applied to integrate and associate a single object type segmentation result to each image pixel. The object segmentation result integration module 200 uses a plurality of object type specific segmentation results 110, 112, 114 to create integrated object segmentation result output 210.

Figure 3:
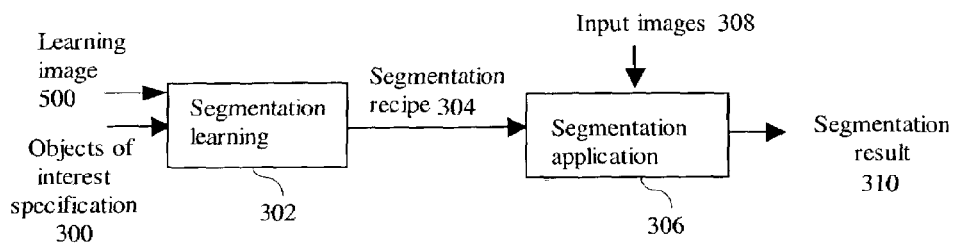
FIG. 3 shows an overall processing architecture for the learnable object segmentation method.

The overall processing architecture for the system is shown in FIG. 3. It includes a segmentation learning module 302 and an application module 306. To prepare the method for object segmentation, at least one learning image 500 and objects of interest specification 300 are provided to a segmentation learning module 302 that processes the learning image in the learning mode according to the objects of interest specification. The learning mode allows the user to tailor the system for their specific application needs. The segmentation learning module 302 creates segmentation recipe 304 for the specific application. The segmentation recipe includes the processing methods and parameters for object region of interest detection and for object type specific segmentation modules. The segmentation recipe 304 is used by the segmentation application module 306 to perform the object segmentation process as depicted in FIG. 1 or FIG. 2.

Figure 4:
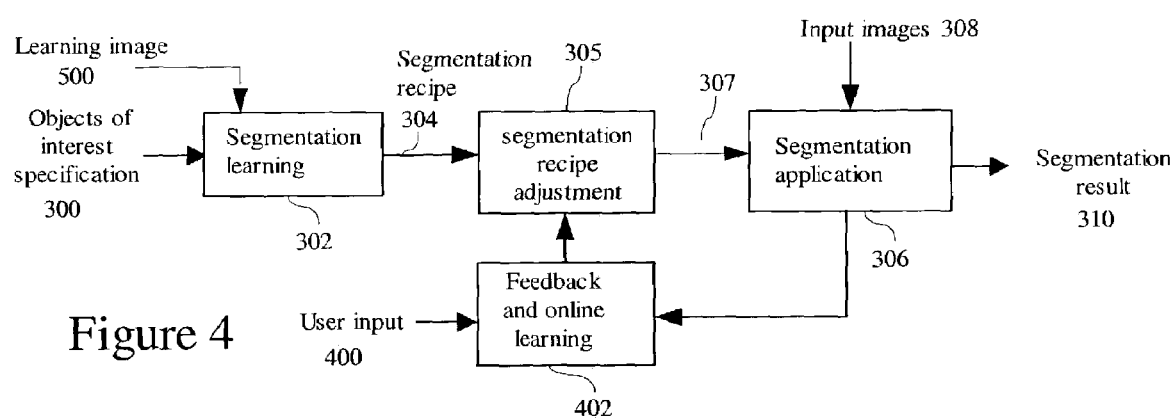
FIG. 4 shows an alternative overall processing architecture for the learnable object segmentation method.

The segmentation learning module 302 performs the learning during the starting or setup stage of the method. As shown in FIG. 4, feedback learning and an online learning modes 402 could be included to allow the update of the segmentation recipe 305 by user directed or automatic learning using the input images. Feedback learning uses user input 400 to update the segmentation recipe 305 and online learning automatically updates the segmentation recipe without user direction. However, the incorporation of the online learning updated recipe 307 could be under the users' supervision. In one embodiment of the invention, the regulation learning method (Shih-Jong J. Lee, "Method for Regulation of Hierarchic Decisions in Intelligent Systems", U.S. patent application Ser. No. 09/972,057 filed Oct. 5, 2001), which is incorporated in its entirety herein is used for feedback learning. The online Learning method (Shih-Jong J. Lee et. al., "Online Learning Method In a Decision System", U.S. patent application Ser. No. 10/118,553 filed Apr. 10, 2002), which is incorporated in its entirety herein is used for online learning. Those having ordinary skill in the art should recognize that other learning methods such as artificial neural networks could be used for feedback and online learning.

I. Segmentation Learning

The segmentation learning module 302 inputs at least one learning image and an objects of interest specification 300. It outputs a segmentation recipe for the specific application 304. The segmentation recipe includes the processing methods and parameters for object region of interest segmentation and for object type specific segmentation modules.

I.1. Objects of Interest Specification

The objects of interest specification can be defined by either manual input or semi-automatic input. In one embodiment of the invention, a Graphical User Interface (GUI) is provided to facilitate the objects of interest specification process. This results in the Object Region Of Interest (OROI) mask 602 and object type specific Object Of Interest (OOI) masks 726, 742 for learning.

A. Manual Inputs

In the manual input mode, users enter an object type count that specifies the number of object types that will be learned by the segmentation method. The users also specify at least one representative object of each type. The specification could be performed by drawing the boundary of the object of interest through a GUI or by other means of specification.

In addition to the above information, optional inputs can be provided. These include representative object region(s) of interest (OROI) of each type, and non-objects of interest examples. Furthermore, users could enter the relations between different object types such as inclusion (for example, a nucleus is inside a cell and a nucleolus is inside a nucleus), adjacency (overlapping, touching, non-touching, etc.), and exclusion (for example, mitochondria is outside a nucleus, etc.).

B. Semi-Automatic Inputs

When users are unsure of the types of objects to be specified, such as in an exploratory mode, or in the case of unskilled users, the object segmentation system could automatically generate potential object types of interest to assist users for the object information specification.

Figure 5:
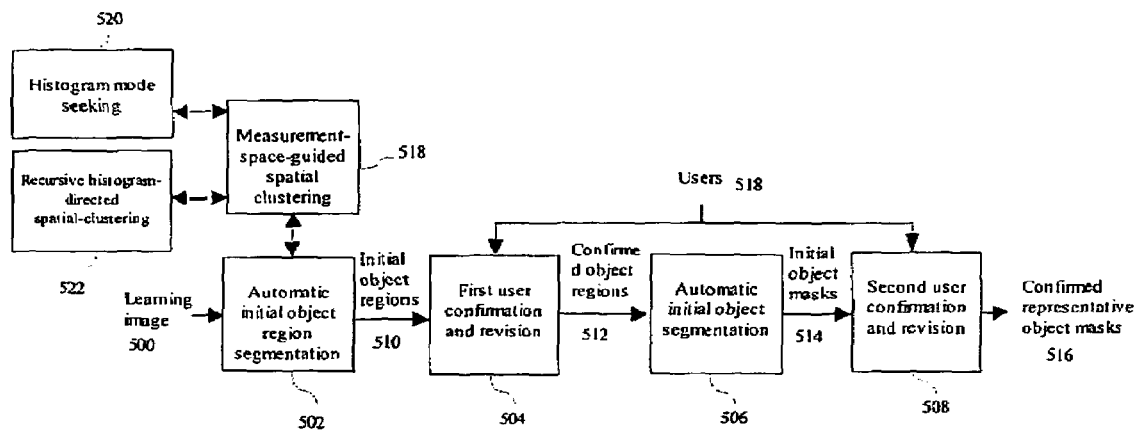
FIG. 5 shows the processing flow for the semi-automatic input method.

The processing flow of the semi-automatic input process is shown in FIG. 5. As shown in FIG. 5, an automatic initial object region segmentation module 502 receives the learning image 500 to generate initial object regions 510. The initial object regions 510 are presented to the first user confirmation and revision module 504 for users 518 confirmation and/or revision. This results in confirmed object regions 512. An automatic initial object segmentation module 506 is then applied to the confirmed object regions 512 of each object type. This results in initial object masks 514 for objects of different types. The initial object masks are presented to the second user confirmation and revision module 508 for users 518 confirmation and/or revision. The users could also select a subset of representative object masks for different object types. This results in a confirmed representative object masks 516 output.

B.1 Automatic Initial Object Region Segmentation

In one embodiment of the invention, the automatic initial object region segmentation process 502 is performed using color and/or intensity space clustering directed segmentation. The method defines a partition in the measurement space such as color and/or intensity of the image. Then each pixel is assigned the label of the object in the measurement-space partitions to which it belongs. In one embodiment of the invention, the measurement-spacea-guided spatial clustering method 518 includes histogram mode seeking 520 or a recursive histogram-directed spatial-clustering 522 scheme as described in Haralick R M and Shapiro L G, "Computer and Robot Vision", Vol. 1, Addison-Wesley, 1992, PP. 511–535.

This segmentation process is, in general, an unsupervised clustering approach, since no a-priori knowledge about the number and type of regions present in the image is available. The accuracy of this method depends directly on how well the objects of interest in the image can be separated into distinctive measurement-space clusters. Due to the limited accuracy, user confirmation and/or revision are required for good segmentation results.

Since the measurement-space-based method does not take the spatial information into consideration during the pixel classification, a spatial information based processing is applied to refine the segmentation results. In one embodiment of the invention, the segmentation refinement process is performed by iterative morphological closing and opening to fill the gap between initially segmented regions using the method described in U.S. Pat. No. 6,463,175 by Shih-Jong J. Lee entitled, "Structure-guided image processing and image feature enhancement", which was issued Oct. 8, 2002.

Those having ordinary skill in the art should recognize that other image processing methods such as edge detection could be used and they are all within the scope of this invention.

B.2 Initial Object Region User Confirmation and Revision 504

The initial object regions created by the automatic initial object region segmentation process 502 are presented to users for confirmation and/or revision. In one embodiment of the invention, the object image with color overlay is shown to the user where different colors are assigned to the initial object regions of different types. A digital or analog display can be used to show the image. The overlay could be transparent so the users can see through the color overlay or the users are allowed to hide and resume overlay efficiently.

Users are provided tools to add or remove pixels from the initial object regions, to merge or split regions and to assign region types. This results in confirmed object regions 512 for different types.

B.3 Automatic Initial Object Segmentation 506

The automatic initial object segmentation 506 is performed separately for each confirmed object type on the confirmed object region(s) 512 for the type.

In one embodiment of the invention, the automatic initial object segmentation process is performed using measurement-space clustering directed segmentation that is similar to the method described in section B.1. However, additional measurements such as edge intensity are included with color/intensity for multi-dimensional clustering. After clustering, each pixel is assigned the label of the object in the measurement-space partitions to which it belongs. This results in the initial object masks.

Those having ordinary skill in the art should recognize that other image processing methods such as image texture enhancement, high-pass and band-pass filters could also be used and they are all within the scope of this invention.

B.4 Initial Object Masks User Confirmation and Revision 508

The initial object masks 514 created by the automatic initial object segmentation process 506 are presented to users for confirmation and/or revision. In one embodiment of the invention, the object image with color overlay is shown to a user. A digital or analog display can be used to show the image. The overlay could be transparent so the users can see through the color overlay or the users are allowed to hide and resume the overlay efficiently.

Users are provided tools to add or remove pixels from the initial object masks, to merge or split masks and to assign region types. Note that a user is allowed to select the well-segmented representative objects rather than revising and confirming all objects of a given type. Furthermore, a user could select a segmented non-object-of-interest and label it as such so that the object segmentation learning system could learn to reject non-objects-of-interest.

I.2. Object Region of Interest (OROI) Segmentation Learning

Figure 6:
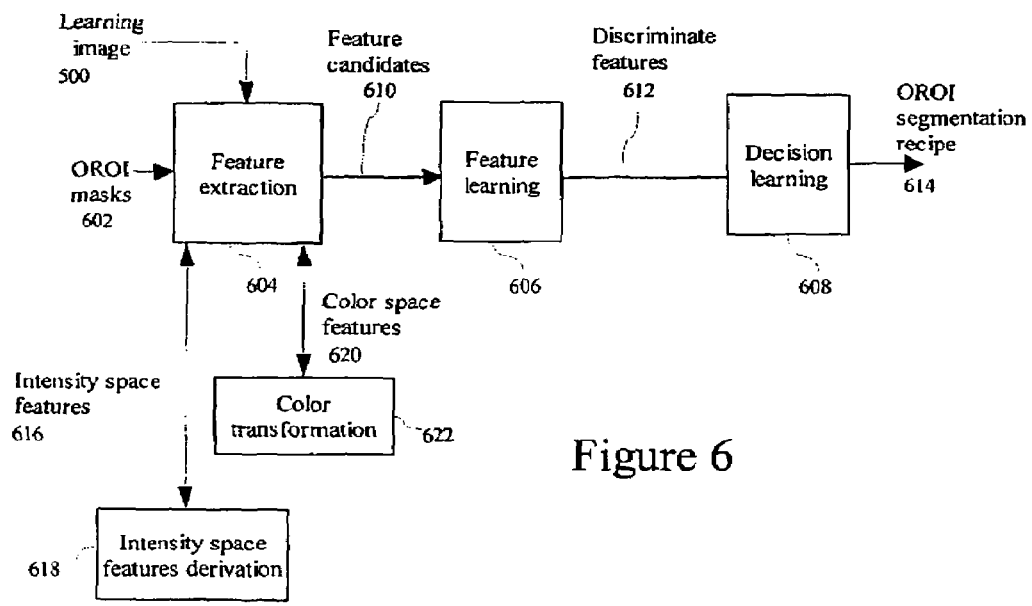
FIG. 6 shows the processing flow for the object region of interest segmentation learning process.

After objects of interest specification step 602, object region of interest and representative object masks are available for learning. The OROI segmentation learning process (FIG. 6) creates an OROI segmentation recipe 614 based on the specified object region of interest 602. The OROI segmentation recipe is pixel based and can be applied to the measurements associated with each pixel to arrive at a decision for the pixel label. The valid pixel labels include all object types and a non-object type. A pixel that is contained within no objects of interest should be classified as a non-object type. The OROI segmentation learning process includes a feature extraction stage 604 followed by a feature learning stage 606, and then a decision learning stage 608 as shown in FIG. 6. It inputs a learning image 500 and object region of interest masks 602. It then performs feature extraction 604 using the learning image and the object region of interest masks. This results in a feature candidates 610 output. It further performs feature learning 606 using the feature candidates 610 to create a discriminate feature 612 output. Finally, it performs decision learning 608 using the discriminate features to create an OROI segmentation recipe 614 output.

C. Feature Extraction

To assure that most of the potentially discriminate features are evaluated, a comprehensive set of features is extracted in this stage. The extracted features are evaluated in the feature learning stage.

In one embodiment of the invention, features are associated with each pixel. That is, each feature can be represented by an image where the feature value of a pixel is stored in its corresponding location of the feature image. The preferred embodiment features are listed as follows:

C.1 Intensity space features 616

The intensity space features are derived 618 from the grayscale intensity of the learning image. In addition to the original grayscale intensity, a pixel neighborhood (such as 3×3, 5×5, 7×7 etc.) is defined. The grayscale intensity statistics such as mean, standard deviation, skewness, kurtosis and other statistics are derived as intensity space features. Moreover, pre-processing of the grayscale intensity can be performed before gathering the statistics. The pre-processing methods include point operations such as logarithm conversion for optical density measurement or filtering such as edge enhancement by linear or morphological gradient operator that includes dark edge, bright edge, and general edge enhancement as described in Lee, J S J, Haralick, R M and Shapiro, L G, "Morphologic Edge Detection," IEEE Trans. Robotics and Automation RA3(2): 142–56, 1987.

Those having ordinary skill in the art should recognize that other intensity space features could be used and they are all within the scope of this invention.

C.2 Color Space Features 620

When the input is a color image, color transformation 622 can be applied to convert the color image into multi-bands of grayscale images. In one embodiment of the invention, the invention, the multiple bands includes the following images: R (Red channel), G (Green channel), B (Blue channel), (R−G)/(R+G), R/(R+G+B), G/(R+G+B), B/(R+G+B), R/G, R/B, G/B,G/R, B/G, B/R, etc.

The intensity space features with and without pre-processing as described in section C.1 can be generated for each band of the image as the color space features.

Those having ordinary skill in the art should recognize that other feature spaces such as temporal space or different focal planes could be used to derive useful features and they are all within the scope of this invention.

D. Feature Learning

After feature extraction, each pixel has an associated feature vector containing the features extracted in the feature extraction stage. Furthermore, each pixel is given a unique label as either one of the valid object types or a non-object type. The labels are derived from the object region of interest image created from the objects of interest specification step. The labeled feature vectors can be used for feature learning. The feature learning includes feature selection and feature transformation steps.

D.1 Feature Selection

The feature selection method selects a subset of features that could discriminate between pixels of different labels (classes). Feature selection reduces the dimensionality of the data to be processed by the classifier, reducing execution time and improving predictive accuracy.

In one embodiment of the invention, the CFS (Correlation-based Feature Selection) method described in Hall, M. A. Correlation-based feature selection for discrete and numeric class machine learning. *Proceedings of the Seventeenth International Conference on Machine Learning*, Stanford University, CA. Morgan Kaufmann Publishers, 2000 can be used for feature selection. The CFS algorithm is based on the following hypothesis: a good feature subset is one that contains features highly correlated with (predictive of) the class, yet uncorrelated with (not predictive of) each other. Other feature selection methods such as the branch and bound method, sequential forward selection method, or sequential backward selection method could also be used. (See Devijver and Kittler, Pattern Recognition: A Statistical Approach", PHI, NJ, 1982 PP. 212–219)

Those having ordinary skill in the art should recognize that other feature selection methods could be used and they are all within the scope of this invention.

D.2 Feature Transformation

The feature transformation step transforms the original feature set into a smaller set of derived features. The classifier can then run on this derived set of features. Examples are principal components analysis, factor analysis and independent components analysis. Such techniques can results in reasonable classification performance.

In one embodiment of the invention, the principal components analysis method is used for feature transformation. It is a dimensionality reduction technique, in which d-dimensional data vectors are mapped onto vectors in a new M-dimensional space, where M<d. To do this, the mean and covariance matrices of the data are calculated, and the best M dimensional linear representation of the data is formed by the mean plus the projection of the data onto the eigenvectors of the covariance matrix corresponding to the M largest eigenvalues.

Those having ordinary skill in the art should recognize that other feature transformation methods could be used and they are all within the scope of this invention.

E. Decision Learning

After feature learning, discriminate features 612 are derived. The discriminate features 612 are extracted for all pixels of the image and are used to perform decision learning 608. Decision learning is achieved by a supervised learning method. It creates a pixel classifier that assigns each pixel to one of the object types or a non-object type. The pixel classifier and the selected features constitute the OROI segmentation recipe 614.

A number of different supervised learning methods can be used such as decision tree, neural networks, K-nearest neighbor classifier, kernel-based classifier (such as Parzen windows), finite mixture models, Fisher's linear, Bayes quadratic, etc.

In one embodiment of the invention, a decision tree classifier is used for decision learning. Decision trees represent a learned function for classification of discrete-valued target functions. Decision trees classify novel items by traversing the tree from the root down to a leaf node, which assigns a classification to the item (Breiman L., Friedman J. H., Olshen R. A. and Stone C. J., "Classification And Regression Trees", Chapman &Hall/CRC, 1984, PP.18–58; Quinlan J. R., "C4.5 Programs For Machine Learning", Morgan Kaufmann, 1993, PP.17–26; U.S. patent application Ser. No. 09/972,057 entitled, "Regulation of Hierarchic Decisions in Intelligent Systems"; U.S. patent application Ser. No. 10/081,441 entitled, "Information Integration Method for Decision Regulation in Hierarchic Decision Systems").

In a challenging classification situation, a boosting and bagging scheme can be used to enhance the results of the decision tree classifier. However, this can result in a more computationally expensive decision classifier.

Boosting (See Robert E. Schapire, "*The boosting approach to machine learning: An overview*", MSRI Workshop on Nonlinear Estimation and Classification, 2002) is applied to improve the decision algorithm's accuracy. Boosting works by repeatedly invoking a weak learner (a learning algorithm for which the training set error rate is only slightly better than that of random guessing) on a set of training samples, over which a distribution is maintained. This distribution starts off as a uniform distribution, but is adapted so that after each iteration the weight given to incorrectly classified training examples increases. As such, the weak learner must give greater emphasis to the hard samples in the training set.

Bagging (bootstrap aggregation) (Dietterich, T. G., "*Ensemble Methods in Machine Learning.*" In J. Kittler and F. Roli (Ed.) First International Workshop on Multiple Classifier Systems, Lecture Notes in Computer Science New York: Springer Verlag., 2000, PP. 1–15.) is a very simple method of manipulating the training data set. A bootstrap sample is generated by uniformly sampling m instances from the training set with replacement. A classifier is then built from the bootstrap sample. This process is repeated several times, and the final classifier is constructed by taking a majority vote of the classifiers built using the bootstrap replicates.

Those having ordinary skill in the art should recognize that other pattern recognition and classification methods could be used for decision learning and that they are within the scope of this invention.

I.3. Object of Interest (OOI) Segmentation Learning

After the objects of interest specification step (726, ..., 742), representative object masks are available. The OOI segmentation learning process (FIG. 7) creates an OOI segmentation recipe based on the defined representative object masks. OOI segmentation learning is performed separately for each confirmed object type on the confirmed object region(s) for the type.

The OOI segmentation recipe (736, ..., 756) is pixel based and can be applied to the measurements associated with each pixel to arrive at a decision for the pixel label. The pixel labels include object, non-object, and unknown. A pixel that is well within the object and/or can be confidently called an object pixel should be labeled as "object". A pixel that is outside the object and/or can be confidently called a non-object pixel should be labeled as "non-object". A pixel that is within the object yet is close to the boundary of the object or cannot be confidently called object or non-object should be labeled as "unknown".

In another embodiment of the invention, the image pixels are pre-labeled for learning. The pixels within the OROI of the object type yet outside the object masks are labeled as "non-object". The boundary regions of the representative object masks are detected and the pixels within the boundary are labeled as "unknown" for learning. The representative object mask pixels outside the boundary region are labeled as "object" pixels.

Those having ordinary skill on the art should recognize that other methods of pixel labels could be applied and that they are all within the scope of the invention.

Figure 7:
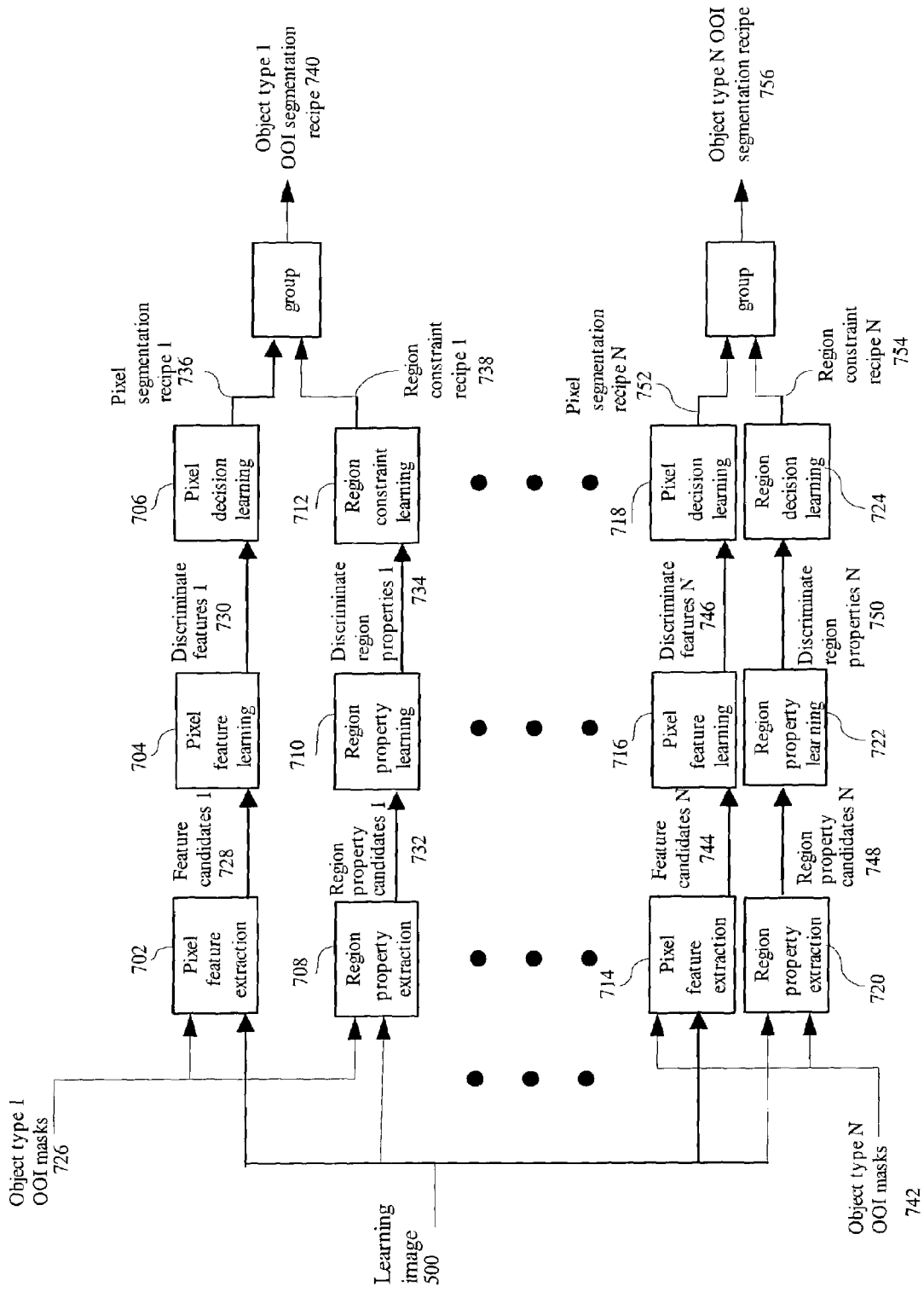
FIG. 7 shows the processing flow for the object of interest segmentation learning process.

The OOI segmentation learning process is performed separately for each of the object types. The OOI segmentation learning process for an object type includes a pixel classifier learning module and a region constraint learning module. The processing flow is shown in FIG. 7. The learning image 500 is divided into different object of interest masks 726, ..., 742, each corresponding to an object type. The representative object of interest mask and the learning image are used for the OOI segmentation learning for the object type. This results in the OOI segmentation recipe 740, ..., 756 for the object type. The process is repeated for all object types.

The pixel classifier learning module includes a pixel feature extraction stage 702, ..., 714, followed by a pixel feature learning stage 704, ..., 716, and then a pixel decision learning stage 706, ..., 718. It performs pixel feature extraction using the input image and the object of interest mask 726, ..., 742 having feature candidates output 728, ..., 744. It then performs pixel feature learning 704, ..., 716, using the feature candidates having at least one discriminate feature output 730, ..., 746. It further performs pixel decision learning using the at least one discriminate feature having a pixel segmentation recipe output 736, ..., 752.

The region constraint learning module includes a region property extraction stage 708, ..., 720, followed by a region property learning stage 710, ..., 722, and then a region constraint learning stage 712, ..., 724. It performs region property extraction using the input image and the object of interest mask 726, ..., 742, having region property candidates output 732, ..., 748. It then performs region property learning using the region property candidates 732, ..., 748 having at least one discriminate region property output 734, ..., 750. It further performs region constraint learning 712, ..., 724 using the at least one discriminate region property 734, ..., 750 having region constraint recipe output 738, ..., 754. The pixel segmentation recipe 736, ..., 752 and the region constraint recipe 738, ..., 754 are grouped into the object of interest segmentation recipe for the object type 740, ..., 756.

F. Pixel Classifier Learning

Pixel classifier learning is performed for each object type. Similar to the OROI segmentation learning, it includes a pixel feature extraction step (e.g. 702), a pixel feature learning step (e.g. 704), and a pixel decision learning step (e.g. 706).

The pixel features used in the pixel feature extraction step are similar to the features used in the OROI segmentation learning. However, the edge enhancement or other spatial filtering is based on a smaller kernel for micro-signal enhancement. In addition to the above described features, an object template could be created from a region of object pixels that is well within the object and/or from a region that is close to the object boundary. The object template is used to match all pixels within object region of interest. The template matching score can be used as a pixel feature.

The pixel labels include "object", "non-object", and "unknown". However, it is most important that the predictive values of "object" and "non-object" be high. That is, when a pixel is classified as "object" (or "non-object") it is most likely an "object" (or "non-object"). This could be at the expense of calling an "object" pixel as "unknown" and a "non-object" pixel as "unknown". Since "unknown" pixels will be refined. Therefore, the features selected for pixel classification should have good discrimination power between "object" and "non-object". To achieve this goal, only pixels of "object" and "non-object" labels are used for feature learning. The same feature learning methods (feature selection and feature transformation) for OROI segmentation learning can be used for pixel feature learning (e.g. 704).

In one embodiment of the invention, a decision tree classifier is used for pixel decision learning (e.g. 706) using the features derived from the pixel feature learning. A two-stage classification approach could be used. The first stage uses a binary decision tree classifier for a quick decision on "object" and "non-object" with high predictive values. A second stage classifier then classifies the remaining "unknown" objects. In one embodiment of the invention, a regulation tree classifier (U.S. patent application Ser. No. 09/972,057 entitled, "Regulation of Hierarchic Decisions in Intelligent Systems"; U.S. patent application Ser. No. 10/081,441 entitled, "Information Integration Method for Decision Regulation in Hierarchic Decision Systems") is used for the second stage classifier. The regulation tree classifier not only classifies a pixel into a class, it also provides a confidence value for the classification.

The first stage binary decision tree classifier learning can be automatically performed and the terminal node statistics gathered. Only the terminal nodes of "object" or "non-object" with nearly perfect result statistics are used to assure high predictive value of the classification results. The terminal nodes of "unknown" class or terminal nodes with high error rates are called "unknown". The "unknown" pixels are used to train the second stage classifier.

G. Region Constraint Learning

Region constraint learning is performed for each object type. It determines object region characteristics that can be used as a constraint for iterative segmentation that merges the "unknown" pixels into "object" or "non-object" regions. Instead of operating on pixel based features, the constraint is based on multiple pixel regions corresponding to objects of interest.

Region constraint learning includes a region property extraction step(e.g. 708), a region property learning step (e.g. 710), and a region constraint learning step (e.g. 710). To perform the learning for an object type, object regions and non-object regions are determined. The object regions can be generated from the representative object masks of the object type and the non-object regions are the remaining regions within the object region of interest for the object type.

G.1 Region Property Extraction

Many pixel features used for pixel classification can be generalized to region based properties. It is preferred that the region properties can be incrementally updated when two regions are merged. Therefore, moments based region properties would be preferred since moment accumulation could be easily merged by simple addition.

G.1.1 Shape Properties

Shape properties can be derived from the binary object mask. The region area can be derived from a zero$^{th}$ order binary moment. The region centroid can be derived from the first order x and y (and z in 3-dimensional case) moments. The region orientation and elongateness (ratio of major and minor axis) can be derived from the second order binary moments. Other higher order moments such as a set of 7 invariant moments (Hu, MK, "Visual Pattern Recognition by Moment Invariants", IRE Transactions on Information Theory, PP 179–187. February, 1962) can also be used.

G.1.2 Intensity and Color Space Properties

The properties are derived from the grayscale intensity or color transformed intensity of the learning image. The color transformation is described in section C.2.

The intensity statistics such as mean, standard deviation, skewness, kurtosis and other moment-based statistics can be derived. Moreover, pre-processing of the grayscale intensity can be performed before gathering the region statistics. The pre-processing includes point operations such as logarithm conversion for optical density measurement or filtering such as edge enhancement by linear or morphological gradient operator that includes dark edge, bright edge, and general edge enhancement.

Those having ordinary skill in the art should recognize that other region properties could be used and that they are within the scope of this invention.

G.2 Region Properties Learning

The feature learning methods (feature selection and feature transformation) for OROI segmentation learning can be used for region properties learning. The region property learning is based on the extracted region properties for "object" and "non-object" regions.

G.3 Region Constraint Learning

The objective of region constraint is to check and discourage the merger of two regions if the merged results reduce the likelihood of being an expected region of the object type. In one embodiment of the invention, sample quantile based statistics are determined for each region property. The f quantile, $q_f$, of a dataset is a value with an approximate fractions f of the data less than or equal to $q_f$. A range of values may satisfy the definition The statistics include sample median $M_0$, corresponding to f=0.5; the lower and upper quartiles corresponding to f=0.25 and f=0.75, respectively. The interquartile range (IQR), the difference between the upper and lower quartiles, is a measure of variation. In addition, the maximum and minimum values of the learned region properties are also determined.

Region constraint can be generated using the above statistics. For example, two regions will not merge if the merged region property value is greater than $M_0$+IQR or less than $M_0$−IQR, etc.

Those having ordinary skill in the art should recognize that other region constraint criteria could be used and that they are within the scope of this invention.

II. Segmentation Application

As shown in FIG. 3, after segmentation learning, the segmentation recipe 304 is stored. The segmentation application module 306 can then process the input images. The segmentation application module includes an object region of interest segmentation stage 102 and an object segmentation stage 104, 106, 108 that performs separate object segmentation for each of the object types as shown in FIG. 2.

II.1. Object Region of Interest (OROI) Segmentation

Figure 8:
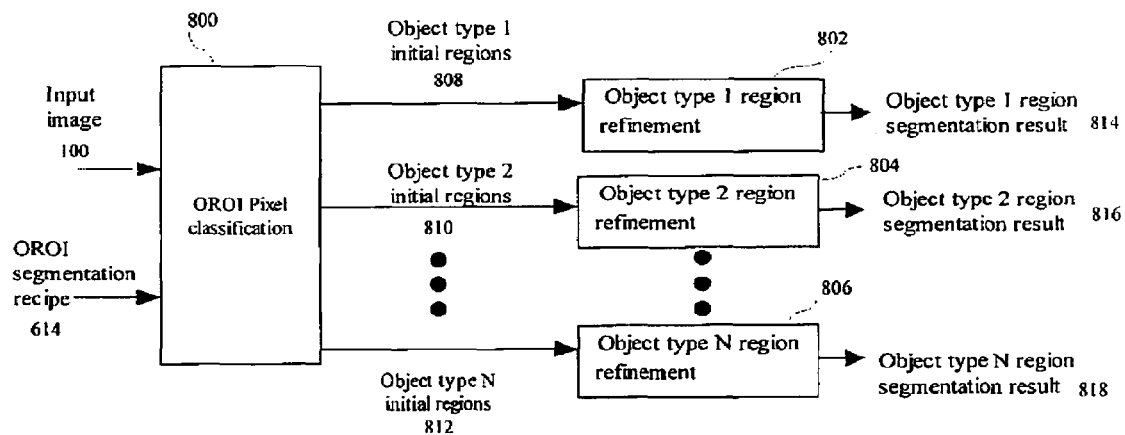
FIG. 8 shows the processing flow for the OROI segmentation.

The OROI segmentation includes pixel classification and region refinement. In one embodiment of the invention, the OROI segmentation process is depicted in FIG. 8. The OROI segmentation process inputs the input image 100 and the OROI segmentation recipe 614. The OROI pixel classification step 800 classifies image pixels into object type specific initial regions 808, 810, 812 on a pixel-by-pixel basis. The object type specific region refinement is a post-processing step that refines (such as fill holes, smooth boundary, etc.) the initial object regions generated from pixel classification. The object type region refinement 802, 804, 806 step is performed for each object region separately. This results in object type specific region segmentation results 814, 816, 818. In one embodiment of the invention, the resulting object regions may overlap. That is, one pixel location may be included in multiple object types. This can be resolved by an object segmentation result integration module 200 as shown in FIG. 2. In another embodiment of the invention, the region refinement is performed for all object types at the same time and there will not be overlapped object regions.

A. OROI Pixel Classification

OROI pixel classification is a relatively straightforward process. It includes a feature extraction step and a decision rule application step. The features to be extracted are specified in the OROI segmentation recipe. In one embodiment of the invention, the extracted features are stored in a multi-band feature image wherein each band stores the values of a specific feature for each pixel location.

After feature extraction, the decision rule defined in the OROI segmentation recipe can be applied to each pixel using the features stored in the multi-band feature image. The decision rule classification results are initial object regions. They can be stored in one output image that has different labels (pixel values) for different object types. Alternatively, multiple binary images can be created, one per object type. Each binary image is used to store the object regions of its corresponding object type.

B. OROI Region Refinement

Pixel classification does not directly consider the classification results of neighboring pixels when classifying a pixel. This could result in holes, isolated extraneous pixels, or discontinuous boundaries in OROI regions. To compensate for the shortcomings of the pixel classification process, the complementary OROI region refinement process is applied. The OROI region refinement process shapes the spatial arrangement of the object regions to fill holes, remove extraneous pixels and smooth region boundaries. In one embodiment of the invention, a structure-guided processing method is applied for region refinement. Structure guided processing using an increasing idempotent processing sequence such as binary morphological opening and closing operations applied alternatively to object region foreground and background (Lee, SJ, "Structure-guided image processing and image feature enhancement" U.S. Pat. No. 6,463,175, Oct. 8, 2002).

II.2. Object of Interest (OOI) Segmentation

Figure 9:
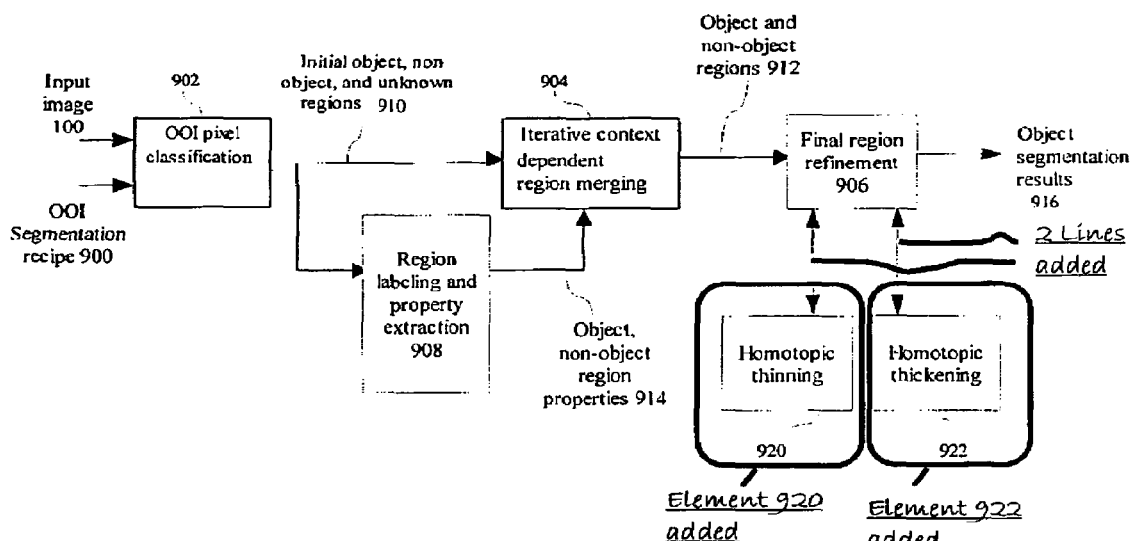
FIG. 9 shows the processing flow for the OOI segmentation of one object type.

The OOI segmentation is performed separately for each object type on the segmented object region(s) for the type. The OOI segmentation includes a pixel classification step, a region labeling and property extraction step, an iterative context dependent region merging step, and a final region refinement step. In one embodiment of the invention, the OOI segmentation process for an object type is depicted in FIG. 9.

The input image 100 along with the OOI segmentation recipe 900 is processed by the OOI pixel classification step 902 to create initial object, non-object, and unknown regions 910. The connected components of the object and non-object regions are determined and each component is given a unique label. Furthermore, the region properties of each component are extracted by the region labeling and property extraction step 908. The initial object, non-object, and unknown regions 910 along with the object and non-object region properties 914 are used by the iterative context dependent region merging step 904 to merge the unknown pixels into object and non-object regions 912. This results in an image of object and non-object regions 912. The object and non-object regions are subject to final region refinement step 906 to create the object segmentation results 916.

C. OOI Pixel Classification

OOI pixel classification includes a feature extraction step and a decision rule application step. The features to be extracted are specified in the OOI segmentation recipe. In one embodiment of the invention, the extracted features are stored in a multi-band feature image wherein each band stores the values of a specific feature for each pixel location.

After feature extraction, the decision rules defined in the OOI segmentation recipe can be applied to each pixel using the features stored in the multi-band feature image. In one embodiment of the invention, two output images are created. The first output image stores the initial object segmentation masks that have different labels for "object", "non-object ", and "unknown". The second output image stores the object confidence values for "unknown" pixels.

When two-stage classification approach is used, the first stage binary decision tree classifier is applied first for each pixel. If the decision result is either "object" or "non-object ", the corresponding label is written to the first output image. If the decision result is "unknown", the second stage classifier is invoked. If the second stage decision result is either "object" or "non-object", the corresponding label is written to the first output image. If the second stage decision result is "unknown", the "unknown" pixel is assigned to the pixel in the first output image. In addition, the pixel's object confidence value is written to the second output image.

D. Region Labeling and Property Extraction

A connected component analysis is performed on the initial "object" and "non-object" segmentation masks (Haralick, R M, Shapiro, R G, "Computer and Robot Vision", Vol. I, PP28–48, Addison Wesley, 1992). The connected component analysis assigns a unique label to each of the connected "object" or "non-object" regions. Furthermore, the selected region properties including the raw moment accumulation data are derived and stored for each region.

E. Iterative Context Dependent Region Merging

The iterative context dependent region merging step merges the unknown pixels into object and non-object regions. By doing so, some of the object regions will be merged among themselves and some of the non-object regions will also be merged. This results in an image of object and non-object regions.

The iterative context dependent region merging process bears some similarity to the region growing segmentation method (Haralick, R M, Shapiro, R G, "Computer and Robot Vision", Vol. I, PP511–535, Addison Wesley, 1992). The "unknown" pixels in the image are scanned in a predetermined manner, such as left-right, or top-down for region merging processing. If an "unknown" pixel is adjacent to an "object" and/or "non-object " region, its features are compared to the region properties. If the difference is small and the post-merged region does not violate region constraint, the pixel is merged into the region. If more than one region has small difference, the pixel is merged into the one with the smallest difference. When a pixel is adjacent to two regions of the same type ("object" or "non-object") and pixel to region merge occurs, if the region properties are similar, and the post-merged region does not violate a region constraint, the two regions are also merged. For merged regions, the region properties are immediately updated.

If none of the above conditions are met, the "unknown" pixels remain to be "unknown". The results of the region merging process are intermediate region merging results. The region merging process is repeated until no more "unknown" pixels exist or no more regions merge. The repeated region merging process could scan the "unknown" pixels in a different sequence such as from right-left, bottom-up or left-right, bottom-up, or right-left, top-down methods for region merging processing. In one embodiment of the invention, different scanning sequences are used for each of the region merging processes.

If "unknown" pixels exist after the process, a final assignment is performed. The final assignment process assigns "object" or "non-object" to the "unknown" pixels by applying a threshold on its object confidence value stored in the second output image of the pixel classification stage. Alternatively, lower merge difference thresholds or relaxed region property constraints can be used. The output of the final assignment process is the iterative context dependent region merging result.

The iterative context dependent region merging process is listed as follows:

a. Scan from top to bottom, left to right:
  i. Merge unknown pixels into adjacent regions if (AND condition)
    1. Pixel to region difference metric, $M_{pr} < T_{pr}$
    2. The post-merged region meets region property constraint
  ii. Merge two adjacent regions if (AND condition)
    3. Pixel to region merge occurs
    4. Region to region difference metric, $M_{rr} < T_{rr}$
    5. The post-merged region meets region property constraint
b. Check stopping criteria, if meet stop
c. Else go to a.

In one embodiment of the invention, the pixel to region difference metric, $M_{pr}$, can be derived using a statistical test. The following illustrates a single feature example:

Let R be a region of N pixels adjacent to a pixel with feature value f. We can define the mean $\mu$ and scatter $S^2$ by $$\mu = \frac{1}{N} \sum_{(x,y) \in R} f(x, y)$$

$$\text{and } S^2 = \sum_{(x,y) \in R} [f(x, y) - \mu]^2 = \sum_{(x,y) \in R} f(x, y)^2 - N\mu^2$$

Under the assumption that all the pixels in R and the test pixel f are independent and are identically distributed normals, the statistic $$t = (f - \mu) \Big/ S\left[\frac{(N-1)N}{(N+1)}\right]^{\frac{1}{2}}$$

has a $t_{N-1}$ distribution. If t is small enough, f is added to region R and the mean and scatter are updated by adding f to the first and second order moments:

$$\sum_{(x,y)\in R} f(x, y) + f \text{ and } \sum_{(x,y)\in R} f(x, y)^2 + f^2$$

and recalculate the new mean and scatter values.

To give a statistical meaning to the pixel to region difference threshold, $T_{pr}$, an α-level statistical significance test can be used instead of a fixed $T_{pr}$ value. The fraction α represents the probability that a t-statistic with N−1 degrees of freedom will exceed the value $T_{N-1(\alpha)}$. If the measured T is larger than $T_{N-1(\alpha)}$, then we declare the difference to be significant. In this case, if the pixel and the region really come from the same population, the probability that the test provides an incorrect answer will be α.

The significance level α can be fixed for an application or determined in the learning phase. The value of $t_{N-1(\alpha)}$ is higher for small degrees of freedom and lower for larger degrees of freedom. Thus, for region scatters to be considered equal, the larger a region is, the closer a pixel's feature value has to be to the region's feature mean in order to merge into the region. This behavior tends to prevent an already large region from attracting to it many other additional pixels and tends to prevent the drift of the region mean, as the region gets larger.

The features used for a difference metric can be different for "object" and "non-object" regions. For example, an image grayscale value could be used to merge an "object" region, yet image edge gradient values may be used to merge a "non-object" region. The above example can be generalized to multiple features or to the region-to-region difference metric, $M_{rr}$.

As described in section G.3, region property constraints can be defined from region sample quantile based statistics so that (for example) two regions will not merge if the merged region property value is greater than $M_0$+IQR or less than $M_0$−IQR, etc.

Those having ordinary skill in the art should recognize that other conditions could also be defined in the region property constraints. For example, certain region properties like shape measure constraints may not be considered if the region size is too small. They are within the scope of this invention.

F. Final Region Refinement

The final region refinement step refines the segmented objects. In one embodiment of the invention, homotopic thinning 920 or thickening 922 operations are used. The homotopic thinning 920 or thickening 922 operations do not change the homotopic structure (connectivity) of the object regions but does refine the object shapes (Serra, J, "Image analysis and mathematical morphology," London: Academic, 1982, P.395)

For potential overlapped object regions, the region could be cut into multiple regions by SKIZ (SKeleton by Influence Zones ) of the region (Serra, J, "Image analysis and mathematical morphology," London: Academic, 1982, pp.385–387)

Those having ordinary skill in the art should recognize that other methods of final region refinement could be used and that they are within the scope of this invention.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices or extensions of the methods described and that various modifications, both as to the implementation details and detailed procedures, can be accomplished without departing from the scope of the invention itself.

What is claimed is:

1. A learnable object segmentation method comprising the steps of:
   a) Inputting a learning image for a selected specific application;
   b) Inputting an objects of interest specification for the specific application;
   c) Performing purpose directed segmentation learning using the input image and the objects of interest specification to create a segmentation recipe output wherein the segmentation learning performs learning by example and wherein the segmentation learning method includes an object region of interest segmentation learning step and an object type specific segmentation learning step wherein the object region of interest segmentation learning is applied to the measurements associated with each pixel to arrive at a decision for the pixel label including all object types and a non-object type;
   d) Inputting a second image for the specific application;
   e) Performing segmentation application using the second image and the segmentation recipe to create a segmentation result output for the specific application.

2. A general purpose semi-automatic method for objects of interest specification comprising the steps of:
   a) Inputting a learning image for a selected specific application;
   b) Performing automatic initial object region segmentation using the learning image to create an initial object regions output for the specific application;
   c) Performing first user confirmation and revision using the initial object regions presented to user to create a confirmed object regions output;
   d) Performing automatic initial object segmentation using the confirmed object regions to create an initial object masks output for the specific application wherein the automatic initial object region segmentation uses a measurement-space-guided spatial clustering method including histogram mode seeking or a recursive histogram-directed spatial-clustering;
   e) Performing second user confirmation and revision using the initial object masks presented to user to create a confirmed representative object masks output.

3. An object region of interest segmentation learning method comprising the steps of:
   a) Inputting a learning image for a selected specific application;
   b) Inputting object region of interest masks for the specific application;
   c) Performing feature extraction using the learning image and the object region of interest masks to create a feature candidates output wherein a comprehensive set of features is extracted and features are associated with each pixel and wherein the feature extraction method extracts features associated with each pixel wherein the features are selected from the set consisting of a) Intensity space features wherein the intensity space features are derived from the grayscale intensity of the learning image, and
b) Color space features wherein color transformation is applied to convert the color image into multi-bands of grayscale images;
d) Performing feature learning using the feature candidates to create at least one discriminate feature output wherein the feature learning includes feature selection and feature transformation steps;
e) Performing decision learning using the at least one discriminate feature to create an object region of interest segmentation recipe output for the specific application.

4. An object of interest segmentation learning method comprising the steps of:
a) Inputting a learning image for a selected specific application;
b) inputting an object of interest mask for the specific application;
c) Performing pixel classifier learning using the input image and the object of interest mask to create a pixel segmentation recipe output for the specific application wherein a comprehensive set of features is extracted and features are associated with each pixel for the pixel classifier learning;
d) Performing region constraint learning using the input image and the object of interest mask to create a region constraint recipe output for the specific application wherein
the pixel segmentation recipe and the region constraint recipe are grouped into an object of interest segmentation recipe output for the specific application.

5. The method of claim 4 wherein the pixel classifier learning method further comprises the steps of:
a) Performing pixel feature extraction using the input image and the object of interest mask to create a feature candidates output;
b) Performing pixel feature learning using the feature candidates output to create at least one discriminate feature output;
c) Performing pixel decision learning using the at least one discriminate feature to create a pixel segmentation recipe output.

6. The method of claim 5 wherein the pixel feature extraction method includes the extraction of a template matching score.

7. The method of claim 4 wherein the region constraint learning method further comprises the steps of:
a) Performing region property extraction using the input image and the object of interest mask to create a region property candidates output;
b) Performing region property learning using the region property candidates to create at least one discriminate region property output;
c) Performing region constraint learning using the at least one discriminate region property to create a region constraint recipe output.

8. The method of claim 7 wherein the region property extraction method includes the extraction of moments based region properties.

9. The method of claim 7 wherein the region constraint learning method uses sample quantile based statistics as region constraint.

10. A general purpose object region of interest region segmentation method based on learned recipes comprising the steps of:
a) Inputting an image;
b) Inputting an object region of interest segmentation recipe for a specific application;
c) Performing object region of interest pixel classification using the input image and the object region of interest segmentation recipe to create at least one object type specific initial region output for the specific application wherein the object region of interest pixel classification method further comprises a feature extraction step and a decision rule application step wherein the extracted features are stored in a multi-band feature image wherein each band stores the values of a specific feature for each pixel location;
d) Performing at least one object type specific region refinement for the specific application using the at least one object type specific initial region to create at least one object type specific region segmentation result output wherein the at least one object type specific region refinement method uses a structure-guided processing method.

11. A general purpose object of interest region segmentation method based on learned recipes comprising the steps of:
a) Inputting an image for a specific application;
b) Inputting an object of interest segmentation recipe for the specific application;
c) Performing object of interest pixel classification using the input image and the object of interest segmentation recipe to create an initial object, non-object, and unknown regions output for the specific application;
d) Performing region labeling and property extraction using the input image and the object of interest segmentation recipe to create an object, non-object region properties output for the specific application;
e) Performing iterative context dependent region merging using the initial object, non-object, and unknown regions and the object, non-object region properties to create an object, non-object region output wherein the iterative context dependent region merging step merges the unknown pixels into object and non-object regions;
f) Performing final region refinement using the object, non-object region properties to create an abject segmentation results output wherein the final region refinement performs homotopic thinning or thickening operations.

12. A general purpose iterative context dependent region merging process method comprising the steps of:
a) Inputting an image;
b) Inputting an images of object, non-object, and unknown regions for a specific application;
c) Inputting object, non-object region properties for the specific application;
d) Scanning the "unknown" pixels in the input image in a predetermined manner and perform region merging using the object, non-object region properties to create an intermediate region merging results output for the specific application;
e) Repeating the region merging process until no more "unknown" pixels exist or no more regions merge to create a final intermediate region merging results output;
f) Performing a final assignment using the final intermediate region merging results to create an interactive context dependent region merging result output for the specific application.

* * * * *